United States Patent [19]
Arai

[11] Patent Number: 5,758,219
[45] Date of Patent: May 26, 1998

[54] BRAKE APPARATUS OF RECIPROCALLY ROTATING MEMBER AND MIRROR BRAKING APPARATUS IN SINGLE LENS REFLEX CAMERA

[75] Inventor: Akihiro Arai, Tokyo, Japan

[73] Assignee: Asahi Kogaku Kogyo Kabushiki Kaisha, Tokyo, Japan

[21] Appl. No.: 850,860

[22] Filed: May 2, 1997

[30] Foreign Application Priority Data

May 10, 1996 [JP] Japan .................... 8-116637

[51] Int. Cl.$^6$ .................................... G03B 17/00
[52] U.S. Cl. .............................. 396/447; 396/453
[58] Field of Search .................... 396/453, 456, 396/447

[56] References Cited

U.S. PATENT DOCUMENTS 5,257,052  10/1993  Kurosaki et al. .

Primary Examiner—David M. Gray
Attorney, Agent, or Firm—Greenblum & Bernstein P.L.C.

[57] ABSTRACT

A brake apparatus includes a reciprocally rotating member which reciprocally rotates by an angular displacement smaller than 360°. Two cam surfaces of different shapes are formed on the reciprocally rotating member. A brake drum rotates in association with the reciprocally rotating member. A brake lever is provided with a control arm which engages with a cam surface, and a brake arm which engages with the brake drum. The brake lever swings the brake arm toward or away from the brake drum in accordance with the shape of a cam surface. The control arm of the brake lever can elastically deform, so that it can be located in a position in which it can selectively engage with one of the cam surfaces at the same phase of rotation of the reciprocally rotating member during the forward and reverse rotations thereof.

9 Claims, 4 Drawing Sheets

BRAKE APPARATUS OF RECIPROCALLY ROTATING MEMBER AND MIRROR BRAKING APPARATUS IN SINGLE LENS REFLEX CAMERA

BACKGROUND OF THE INVENTION

1. Field of the Invention

The present invention relates to an apparatus for braking a reciprocally rotating member and an apparatus for braking a mirror in a single lens reflex camera.

2. Description of the Related Art

For instance, in some cameras, it is necessary to brake a reciprocally rotating member (or swing member) which turns in alternate directions through an angle smaller than one complete turn (360°) in the last part of the rotation. Nevertheless, if the reciprocally rotating member is braked at a specific phase of rotation, the brake force is applied to the reciprocally rotating member at the termination of the forward rotation, and at the beginning of the reverse rotation. In the alternative, brake force is applied at the beginning of the forward rotation and the termination of the reverse rotation. For example, in a focal plane shutter, it is necessary to brake the shutter only at the termination of the forward rotation of a drive shaft of the shutter when the shutter is actuated, but nevertheless, the brake force is exerted on the shutter also at the beginning of the reverse rotation of the drive shaft, this reduces operation speed and increases energy loss.

Moreover, in a single lens reflex camera, a quick-return mirror is moved between a view position in which light transmitted through a photographing lens is made incident upon a view finder system, and a retracted position in which the mirror is retracted from the light path of the photographing lens. A drive mechanism of the quick-return mirror is basically comprised of a gear mechanism which lo rotates (swings) the mirror about a mirror shaft in the forward and reverse directions. If the brake force acts on a drive member of the mirror drive mechanism which rotates the quick-return mirror at the termination of the upward and downward movement (forward and reverse rotation) of the mirror, the mirror is subject to the brake force both when the mirror begins moving downward from the uppermost position and when the mirror begins moving upward from the lowermost position. This reduces operation speed and increase energy loss.

SUMMARY OF THE INVENTION

It is an object of the present invention to eliminate the above-mentioned drawbacks of the prior art by providing a brake apparatus in which different brake operations are provided at the same phase of rotation during the forward rotation and the reverse rotation of the reciprocally rotating member. That is, the brake operation is carried out, for example, at the termination of the forward rotation, but no brake force acts at the beginning of reverse rotation.

Another object of the present invention is to provide a brake apparatus of a mirror in a single lens reflex camera in which the brake force is exerted on the mirror immediately before the mirror reaches its uppermost position or lowermost position, but no brake force is applied to the mirror when the mirror begins moving downward from its uppermost position or begins moving upward from its lowermost position.

To achieve the object mentioned above, according to the present invention, there is provided a brake apparatus of a reciprocally rotating member. A reciprocally rotating member reciprocally rotates by an angular displacement smaller than 360°. A cam surface is formed on the reciprocally rotating member. A brake drum rotates in association with the reciprocally rotating member. A brake lever is provided with a control arm which engages with the cam surface, and a brake arm which engages with the brake drum. The brake lever swings the brake arm toward or away from the brake drum in accordance with the shape of the cam surface.

The cam surface is provided with two separate cam surfaces of different shapes.

The control arm of the brake lever is elastically deformable, so that it can be located in a position in which it can selectively engage with the cam surfaces at the same phase of rotation of the reciprocally rotating member during the forward and reverse rotations thereof.

According to another aspect of the present invention, a brake apparatus of a mirror in a single lens reflex camera includes a mirror which is swingable about a mirror shaft between a viewing position in which light transmitted through a photographing lens is made incident upon a view finder system and a retracted position in which the mirror is retracted from a photographing light path. A gear mechanism reciprocally rotates the mirror about the mirror shaft. A reciprocally rotating member in the gear mechanism rotates in alternative directions by an angle smaller than 360° in association with the reciprocal movement of the mirror between the viewing position and the retracted position of the mirror. A cam surface is formed on the reciprocally rotating member. A brake drum rotates in association with the reciprocally rotating member. A brake lever which is provided with a control arm which engages with the cam surface and a brake arm which engages with the brake drum. The brake lever swings the brake arm toward or away from the brake drum in accordance with the shape of the cam surface. The cam surfaces are provided with two cam surfaces of different shapes. The control arm of the brake lever is elastically deformable to engage the control arm with a non-brake section of one of the cam surfaces at the same phase of rotation in the beginning parts of the forward and reverse rotations of the reciprocally rotating member to thereby move the brake arm away from the brake drum and engage the control arm with a brake section of the other cam surface at the same phase of rotation in the last parts of the forward and reverse rotations of the reciprocally rotating member to thereby bring the brake arm into contact with the brake drum.

The present disclosure relates to subject matter contained in Japanese Patent Application No. 08-116637 (filed on May 10, 1996) which is expressly incorporated herein by reference in its entirety.

BRIEF DESCRIPTION OF THE DRAWINGS

The invention will be described below with reference to the accompanying drawings, in which.

DESCRIPTION OF THE PREFERRED EMBODIMENTS

Figure 1:
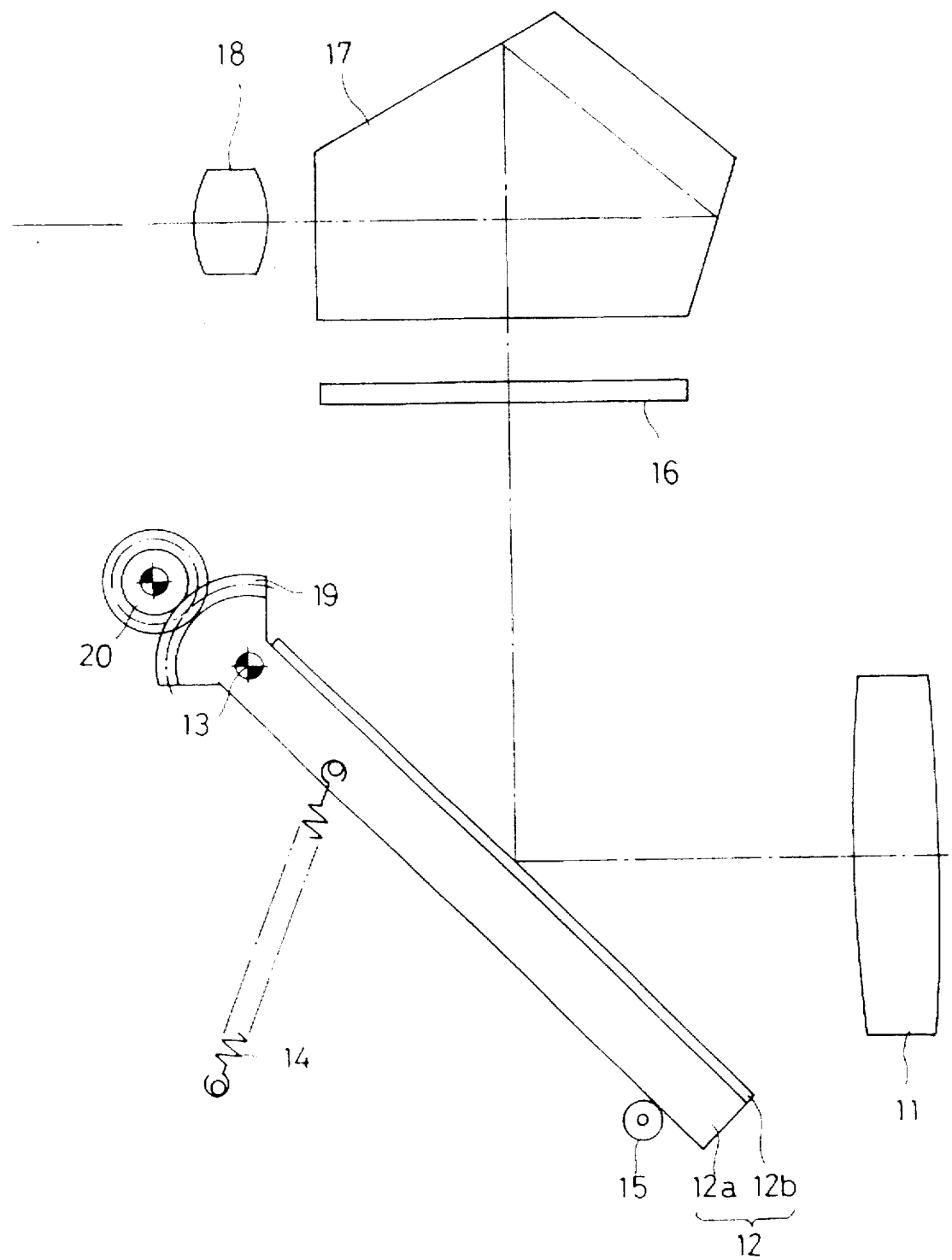
FIG. 1 is a side elevational view of a mirror brake apparatus according to an embodiment of the present invention applied to a mirror drive mechanism in a single lens reflex camera, shown in a viewing position of a mirror.

The illustrated embodiment is applied to a brake apparatus of a mirror in a single lens reflex camera. As shown in FIG. 1, a quick-return mirror (hereinafter referred to as a mirror) 12 located behind a photographing lens 11 includes a mirror sheet or plate 12a. A reflection mirror 12b is provided on the mirror sheet 12a and is rotatably supported by a mirror shaft 13 at the upper end of the mirror 12. The mirror shaft 13 is supported by a mirror box (not shown). The mirror 12 is biased by a tensile spring 14 in the downward direction (i.e., the clockwise direction in FIG. 1). The downward movement of the mirror 12 is restricted by a stop pin 15. The lowermost position defines a viewing position of the mirror 12, in which object light transmitted through the photographing lens 11 is reflected by the reflection mirror 12b and converged onto a focusing plate 16 to form an object image. A pentagonal prism (or pentagonal mirror) 17 and an eyepiece (ocular lens) 18 are provided above the focusing plate 16, so that the object image formed on the focusing plate 16 can be viewed through the eyepiece 18. The upward movement of the mirror 12 is restricted by another stop (not shown).

The mirror sheet 12a is provided with a sector gear 19 whose center is located on the axis of the mirror shaft 13. The sector gear 19 meshes with a drive gear 20. FIGS. 2 through 6 show the mirror brake mechanism around the drive gear 20 by way of example. The drive gear 20 is rotatably supported by a substrate 21 and provided with a coaxial small gear 20a which meshes with an intermediate large gear 23a. An intermediate small gear 23b is coaxially secured to the shaft of the intermediate large gear 23a. The intermediate small gear 23b meshes with a small gear 24a of a brake drum 24.

The reciprocating rotary gear (reciprocally rotating ember) 22 is rotated in forward and reverse directions by an angle smaller than one complete turn (360°) when the mirror 12 is moved between the viewing position and the retracted position. The angular displacement of the rotary gear 22 is indicated by θ in FIG. 2. The gear 22 is provided with stepped cam surfaces extending in the axial direction, i.e., a first cam surface (upper cam surface) 25 and a second cam surface (lower cam surface) 26. The upper and lower cam surfaces 25 and 26 have a symmetrical shape with respect to the center of the angle θ.

The upper cam surface 25 is provided with small diameter brake sections 25b on opposite sides of a large diameter center non-brake section 25a. The lower cam surface 26 is provided with a large diameter non-brake section 26a whose diameter substantially corresponds to the diameter of the brake sections 25b, inclined cam surfaces 26b which connect the non-brake section 26a to the non-brake section 25a, and a guide surface 26c which is located under the non-brake section 25a and the brake section 25b. The guide surface 26 lies in a plane perpendicular to the axis of the gear 22. The large diameter portion 26d defined by the outer peripheral surface of the guide surface 26c that does not function as a cam surface. The non-brake section 25a and the non-brake section 26a are located on the same arc in a plan view of the gear 22. The portions of the cam surfaces 25 and 26 other than the portions discussed above define the same arc (cylindrical surface) as the non-brake sections.

The substrate 21 is provided with a brake lever 31 pivoted thereto through a pivot shaft 30. The brake lever 31 is integrally provided with a control arm 32, a brake arm 33, and a spring arm 34. The brake lever 31 is made of metal can be elastically deformed. A cam follower 35, which can selectively engage with the upper or lower cam surface when the elastic deformation of the control arm 32 occurs, is provided on the front end of the control arm 32. The spring arm 34 is engaged by a pole 36 provided on the substrate 21 to bias the brake lever 31 in a direction in which the cam follower 35 engages with the cam surface 25 or 26. The brake arm 33 moves toward or away from the brake drum 24 due to the swing movement (rotation) of the brake lever 31 about the pivot shaft 30 in accordance with the profile of the cam surfaces 25 and 26.

The brake apparatus constructed as above operates as follows.

Figure 2:
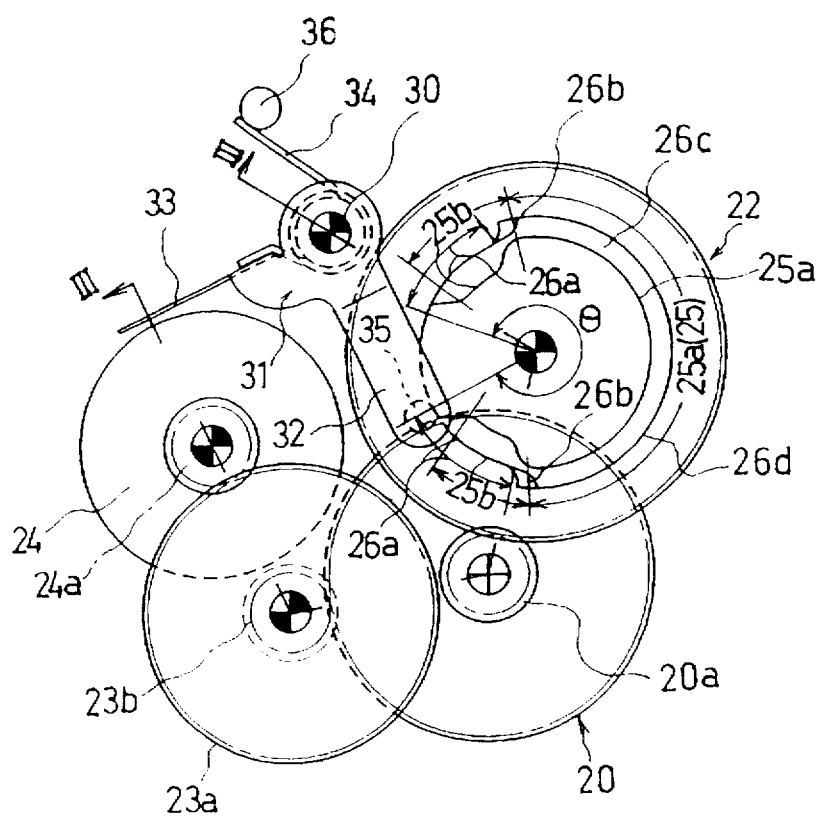
FIG. 2 is a plan view of a mirror drive system (brake system) of a mirror brake apparatus shown in FIG. 1.
Figure 3:
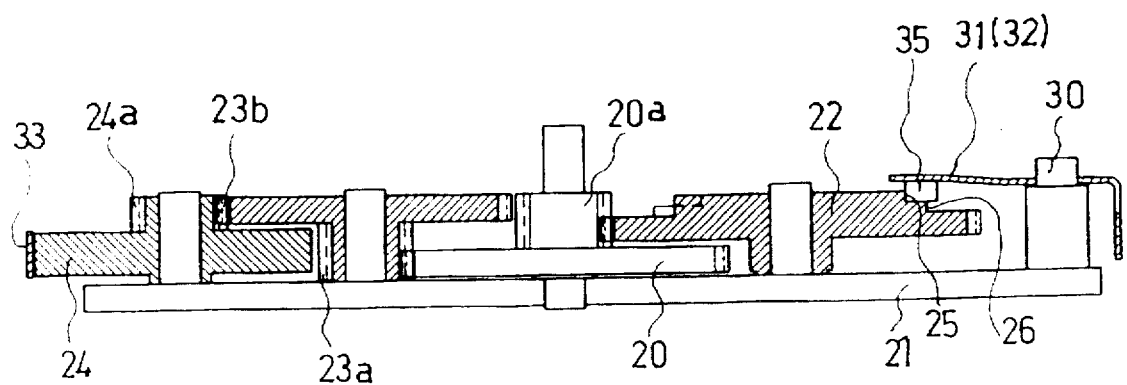
FIG. 3 is a sectional view taken along the line III—III in FIG. 2.

When the mirror 12 is in the viewing position shown in FIG. 1, each gear is located in the positions shown in FIG. 2. The cam follower 35 of the brake lever 31 engages with the non-brake section 26a of the cam surface 26 as shown in FIG. 2. When the cam follower 36 engages with the non-brake section 26a or 25a, the brake arm 33 of the brake lever 31 does not make contact with the brake drum 24. When the cam follower 36 engages with the brake section 25b, the brake arm 33 makes contact with the brake drum 24.

Figure 4:
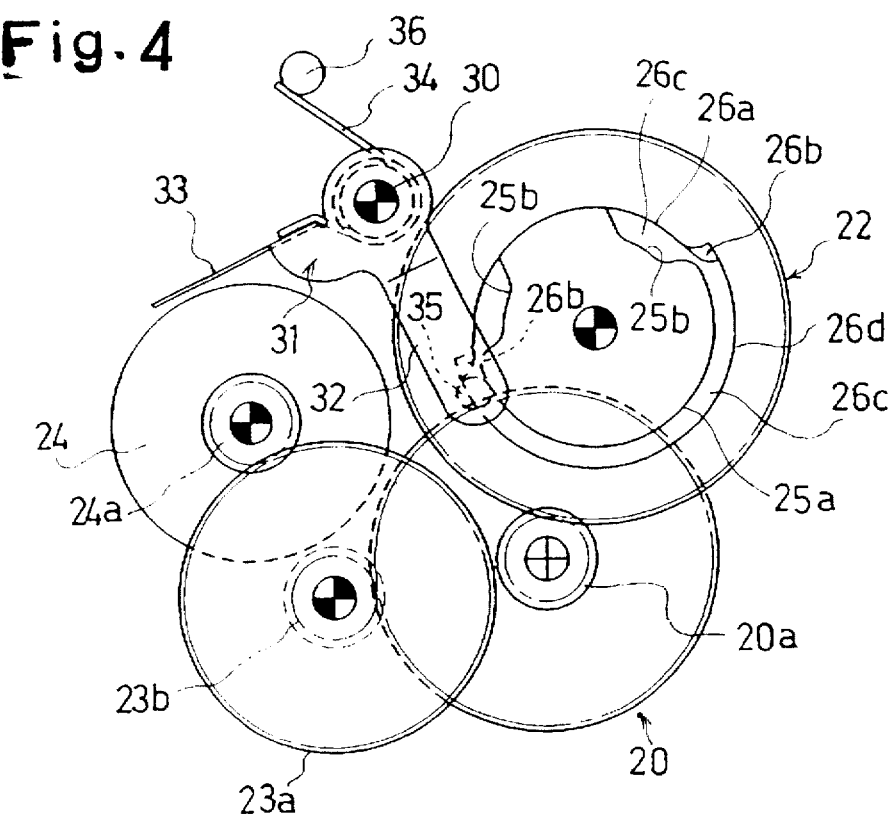
FIG. 4 is a plan view of a mirror drive system shown in an operative position different from FIG. 2.

In this state, when the drive gear 20 is driven by a drive source (not shown) in a direction to move the mirror upward (clockwise direction in FIG. 1 or counterclockwise direction in FIG. 2), the reciprocating rotary gear 22 is rotated in the clockwise direction in FIG. 2. Consequently, the cam follower 35 of the brake lever 31 is moved from the non-brake section 26a of the cam surface 26 to the cam surface 25c of the cam surface 25 through the inclined cam surface 26b, and comes into contact with the non-brake section 25a as shown in FIG. 4. The resiliency of the control arm 32 permits the cam follower 35 to move from the cam surface 26 to the cam surface 25 (which is different in height from the cam surface 26). The non-brake section 26a and the non-brake section 25a are defined by the same large diameter arc (cylindrical surface), so that the brake arm 33 does not contact with the brake drum 24 during the transfer from the non-brake section 26a to the non-brake section 25a.

Figure 5:
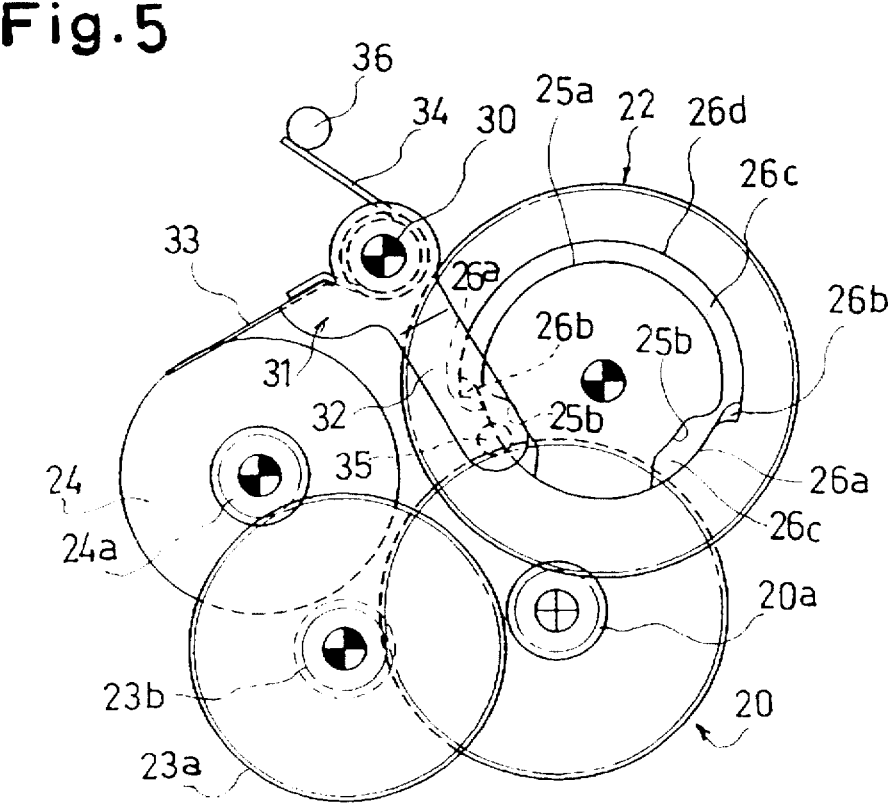
FIG. 5 is a plan view of a mirror drive system shown in an operative position different from FIG. 2 or FIG. 4; and, FIG. 6 is a plan view of a mirror drive system shown in an operative position different from FIG. 2, FIG. 4 or FIG. 5.

When the mirror 12 is moved near its uppermost position, the cam follower 35 is moved relatively from the non-brake section 25a of the cam surface 25 to the brake section 25b. The guide surface 26c located under the cam surfaces of the non-brake section 25a and the brake sections 25b does not permit the cam follower 35 to move from the non-brake section 25a to the lower non-brake section 26a through the inclined cam surface 26b. When the cam follower 35 comes to a position in which it can make contact with the brake section 25b, the brake lever 31 is rotated in the counterclockwise direction, so that the brake arm 33 comes into contact with the brake drum 24 to brake the rotation of the brake drum 24, i.e., the rotation of the mirror (FIG. 5). In this state (FIG. 5), the brake arm 33 is elastically brought into contact with the brake drum 24 at high pressure. The cam follower 35 can but does not contact the brake section 25b. When the mirror 12 reaches its uppermost position (retracted position), i.e., when the reciprocating rotary gear 22 reaches one of the extremities of the rotational movement, the cam follower 35 reaches the terminal end of the brake section 25b, so that the control arm 32 is returned to a position in which it comes into contact with the non-brake section 26a, due to the elasticity of the control arm 32. The above discussion has been directed to the brake operation during the upward movement of the mirror 12.

Figure 6:
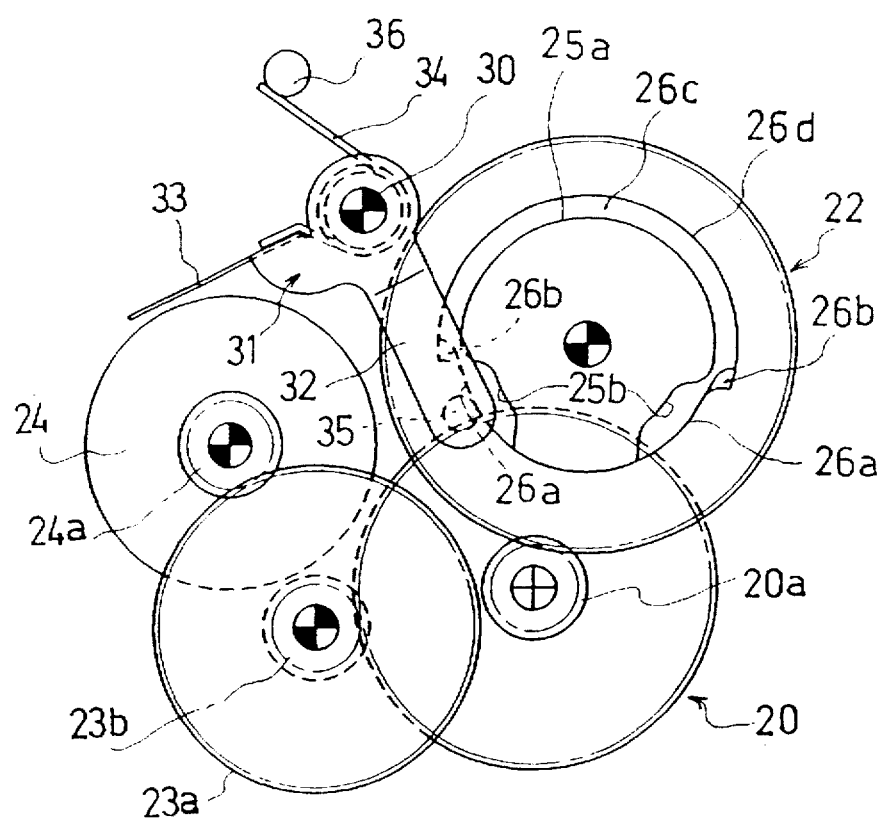

When the mirror 12 is moved from its uppermost position to its lowermost position, the reciprocating rotary gear 22 is rotated in the counterclockwise direction. Consequently, cam follower 35 of the brake lever 31 is moved from the non-brake section 26a of the cam surface 26 to the cam surface (non-brake section) 25a of the cam surface 25 through the inclined cam surface 26b and comes into contact with the non-brake section 25a (FIG. 6). Namely, the cam follower 35 first makes contact with the non-brake section 26a different from the brake section 25b with which the cam follower 35 has made contact during the forward rotation of the rotary gear 22 (during the upward movement of the mirror 12). Thereafter, the cam follower 35 comes into contact with the non-brake section 25a. Thus, the brake arm 33 is kept apart from the brake drum 24.

When the mirror 12 is moved near its lowermost position, the cam follower 31 is relatively moved from the non-brake section 25a to the brake section 25b. The guide surface 26c prevents the cam follower 35 from moving to the lower non-brake section 26a through the inclined cam surface 26b. When the cam follower 35 is moved to a position in which it can make contact with the brake section 25b, the brake lever 31 is rotated in the counterclockwise direction, so that the brake arm 33 comes into contact with the brake drum 24 to brake the rotation of the brake drum 24, i.e., the rotation of the mirror 12. Namely, the cam follower 35 can make contact with the brake section 25b different from the non-brake section 26a with which the cam follower has made contact during the forward rotation of the rotary gear 22 (upward movement of the mirror 12). This state is the same as the state when the mirror 12 is at the termination of its upward movement. Namely, the brake arm 33 elastically makes contact with the brake drum 24 at high pressure due to the elasticity of the brake arm, so that the cam follower 35 can, but does not, make contact with the brake section 25b. When the mirror 12 reaches its lowermost position (viewing position), i.e., when the reciprocating rotary gear 22 reaches the other extremity of the rotational movement, the cam follower 35 reaches the terminal end of the brake section 25b, so that the control arm 32 is returned to a position in which the cam follower 35 comes into contact with the non-brake section 26a, due to the elasticity of the control arm 32. The above discussion has been directed to the brake operation during the downward movement of the mirror 12.

As can be seen from the foregoing, the brake force is exerted on the mirror 12 immediately before the mirror 12 reaches its uppermost or lowermost position. When the mirror 12 begins moving downward from its uppermost position or moving upward from its lowermost position, no brake force is applied to the mirror 12. Thus, the operation speed of the mirror 12 is not reduced and there is no energy loss.

Although the above-mentioned embodiment has been addressed to a brake apparatus for a mirror in a single lens reflex camera in which the brake operation is needed only at the extremities of the reciprocal movement of the mirror, the present invention can be applied to a shutter in which the brake force should be applied thereto only at one of the extremities of the reciprocal movement. In the case of a shutter, since it is necessary to brake the shutter only at the termination of the movement of the shutter, the brake section 25b and the non-brake section 26a can be provided only at the identical phase of rotation in the vicinity of one of the extremities of the rotational movement of the reciprocating rotary gear 22.

Moreover, in the present invention, if the control arm 32 can move between different cam surfaces of the first and second cam surfaces at the same phase of rotation during the forward and reverse rotation of the reciprocating rotary gear 22, different brake operations can be provided for the forward and reverse rotations.

As may be understood from the above discussion, according to the present invention, different brake operations can be obtained at the same phase of rotation, for the forward and reverse rotations of the reciprocating rotary member. Moreover, if the present invention is applied to a brake apparatus for a mirror in a single lens reflex camera, the brake force is exerted on the mirror immediately before the mirror reaches its uppermost position or its lowermost position, but no brake force acts on the mirror when it begins moving downward from its uppermost position or moving upward from its lowermost position.

What is claimed is:

1. A brake apparatus of a reciprocally rotating member, comprising:
    a reciprocally rotating member which reciprocally rotates by a reciprocation angle having an angular displacement smaller than 360°;
    two cam surfaces, having different shapes formed on the reciprocally rotating member;
    a brake drum which rotates in association with the reciprocally rotating member; and
    a brake lever having a control arm which engages the two cam surfaces, and a brake arm which engages with the brake drum, said brake lever swinging the brake arm toward or away from the brake drum in accordance with the shapes of the two cam surfaces;
    wherein said control arm of the brake lever is elastically deformable, so that the control arm can selectively engage one of said two cam surfaces at a same phase of rotation of the reciprocally rotating member during the forward and reverse rotations of said receprocally rotating member.

2. A brake apparatus of a reciprocally rotating member according to claim 1, wherein said two cam surfaces are provided on the outer periphery of said reciprocally rotating member at different heights in an axial direction thereof.

3. A brake apparatus of a reciprocally rotating member according to claim 2, wherein said two cam surfaces are each provided with a non-brake section having a first diameter and a brake section having a second diameter smaller than the first diameter, said reciprocally rotating member further comprising:
    a guide surface which guides said control arm from said non-brake section to said brake section on one of said two cam surfaces when the reciprocally rotating member rotates in one direction; and
    an inclined cam surface which guides said control arm from said non-brake section on one of said two cam surfaces to said non-brake section on the other of said two cam surfaces when the reciprocally rotating member rotates in the other direction.

4. A brake apparatus of a reciprocally rotating member according to claim 3, wherein said two cam surfaces each have a symmetrical shape with respect to the center of the reciprocation angle of said reciprocally rotating member.

5. A brake apparatus of an reciprocally rotating member according to claim 1, wherein said control arm has a cam follower at a free end thereof, said cam follower being engageable with either of said two cam surfaces.

6. A brake apparatus of a mirror in a single lens reflex camera, comprising:

a mirror which is swingable about a mirror shaft between a viewing position in which light transmitted through a photographing lens is made incident upon a view finder system and a retracted position in which the mirror is retracted from a photographing light path;

a gear mechanism which reciprocally rotates the mirror about the mirror shaft;

a reciprocally rotating member in the gear mechanism, which rotates in alternate directions by an angle smaller than 360° in association with reciprocal movement of the mirror between the viewing position and the retracted position of the mirror;

two cam surfaces having different shapes formed on the reciprocally rotating member at different heights in the axial direction, one of said two cam surfaces being provided with non-brake sections and the other of said two cam surfaces being provided with brake sections at the same phase of rotation in the extreme positions in the forward and reverse rotations of the reciprocally rotating member;

a brake drum which rotates in association with the reciprocally rotating member; and a brake lever having a control arm which engages one of said two cam surfaces, and a brake arm which engages the brake drum, said brake lever swinging the brake arm toward or away from the brake drum in accordance with the shapes of the cam surfaces;

wherein said control arm of the brake lever is elastically deformable to engage the control arm with said non-brake section of one of the two cam surfaces at the first extreme position of the forward and reverse rotations of the reciprocally rotating member to thereby move the brake arm away from the brake drum and engage the control arm with said brake section of the other of the two cam surfaces at the same phase of rotation in the second extreme position of the forward and reverse rotations of the reciprocally rotating member to thereby bring the brake arm into contact with the brake drum.

7. A brake apparatus of a mirror in a single lens reflex camera according to claim 6, wherein said non-brake section of said two cam surfaces having a larger diameter than said brake section, and said reciprocally rotating member further comprising a guide surface which guides said control arm from said non-brake section to said brake section on one of said two cam surfaces when the reciprocally rotating member rotates in one direction; and an inclined cam surface which guides said control arm from said non-brake section on one of said two cam surfaces to said non-brake section on the other of said two cam surfaces.

8. A brake apparatus of a mirror in a single lens reflex camera according to claim 6, wherein said two cam surfaces each have a symmetrical shape with respect to the center of the reciprocation angle of said reciprocal rotating member.

9. A brake apparatus of a mirror in a single lens reflex camera according to claim 6, wherein said control arm is provided with a cam follower at a free end thereof, said cam follower being engageable with said two cam surfaces.

* * * * *